UNITED STATES PATENT OFFICE.

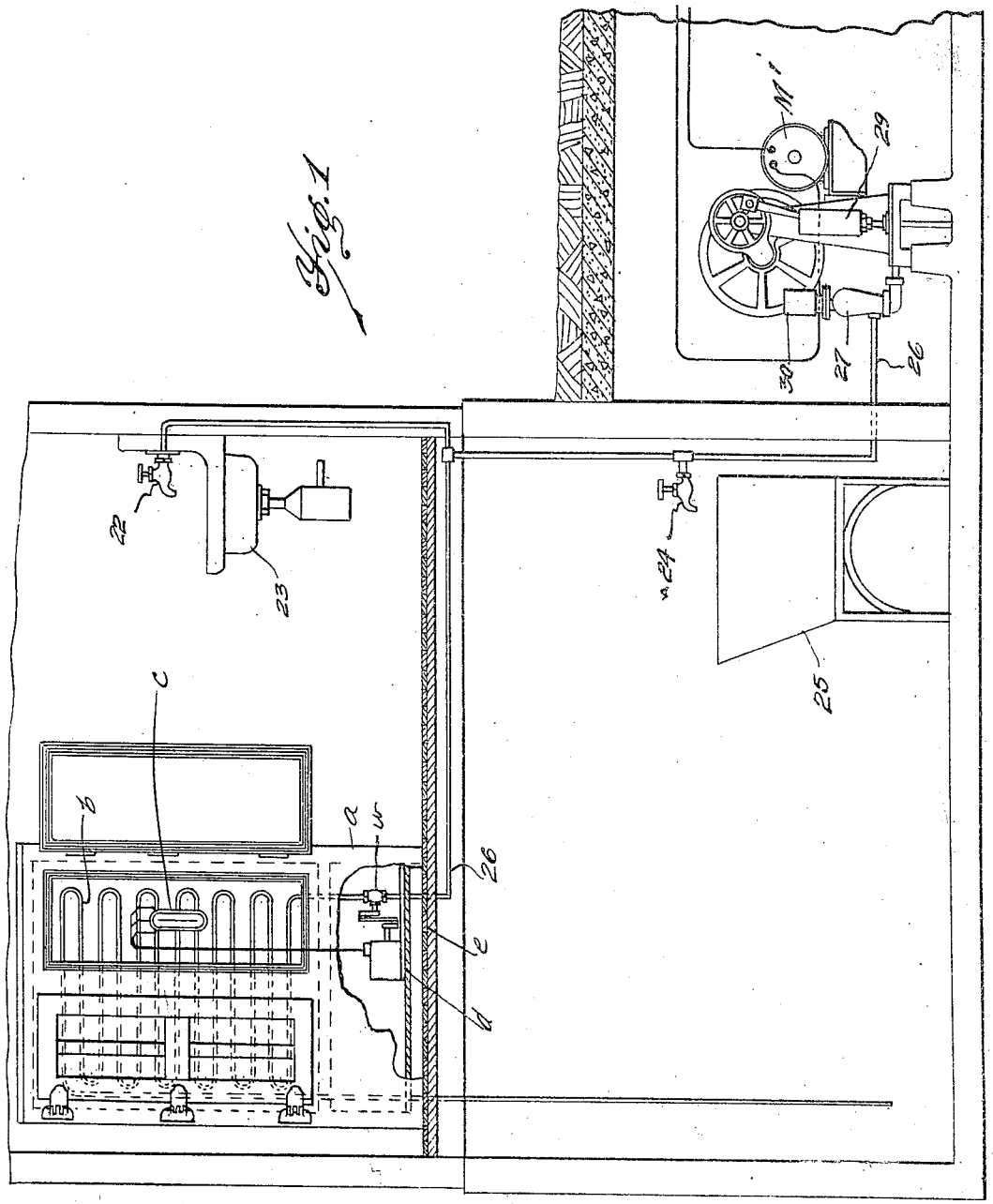

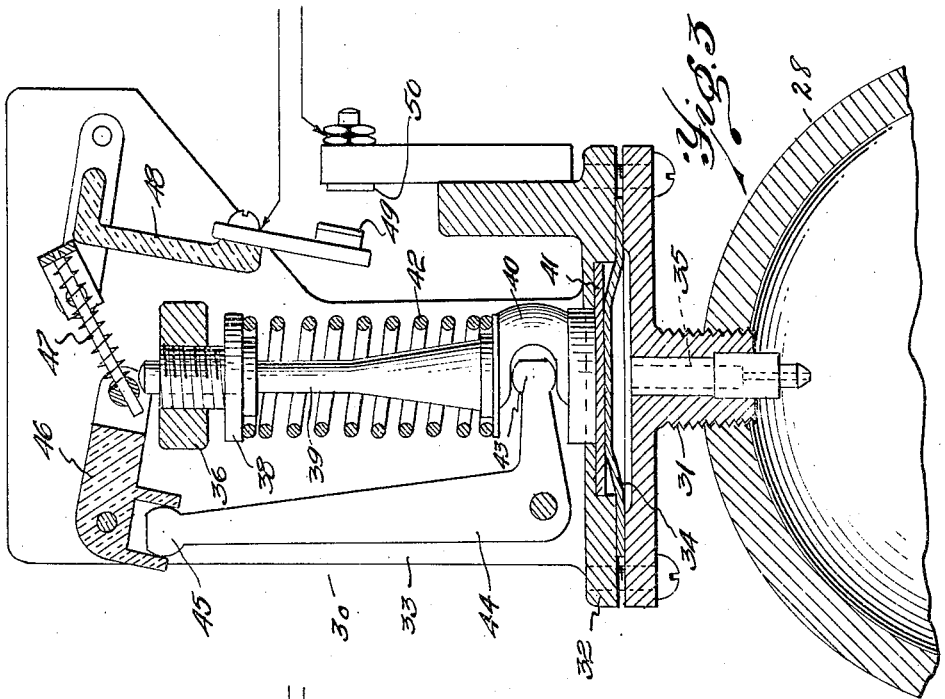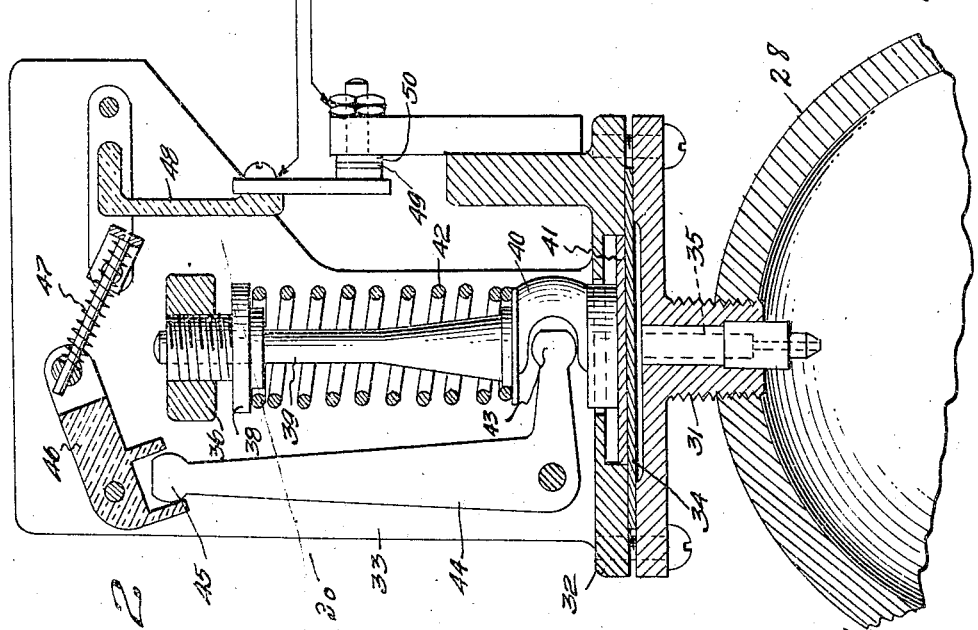

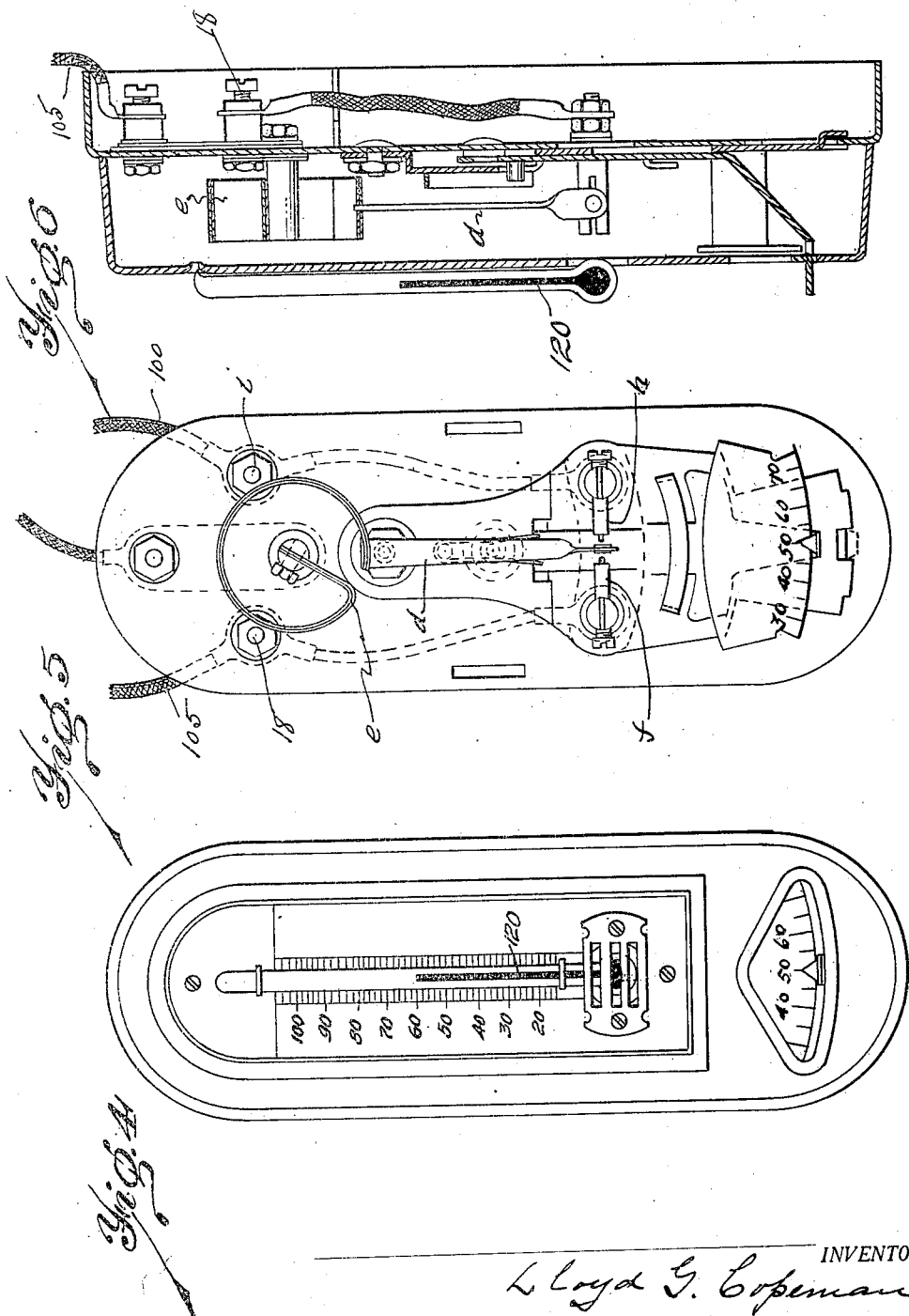

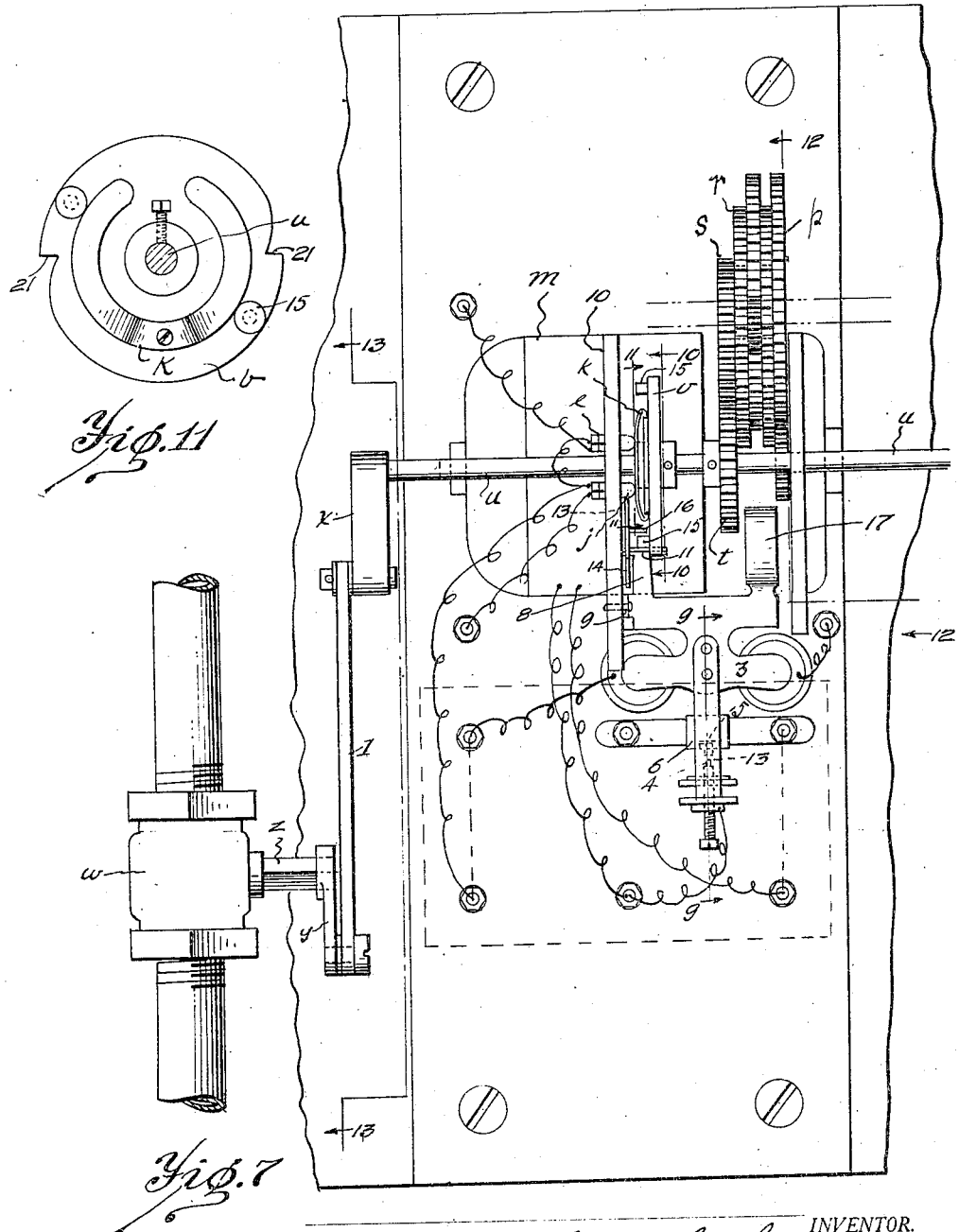

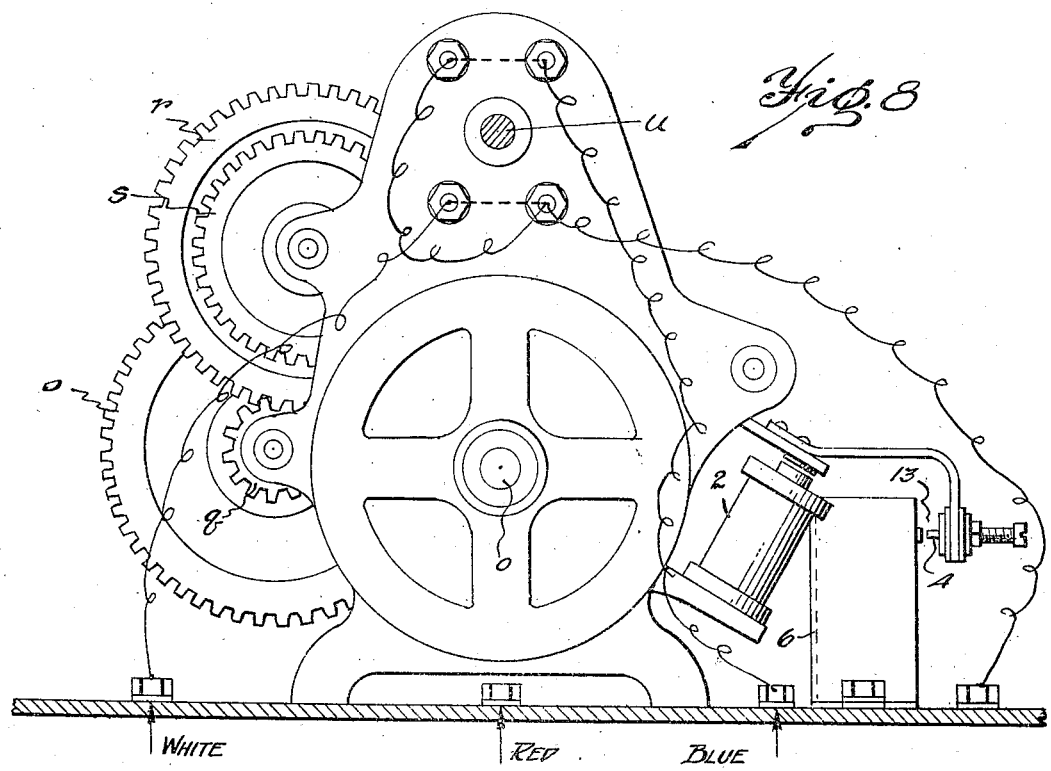
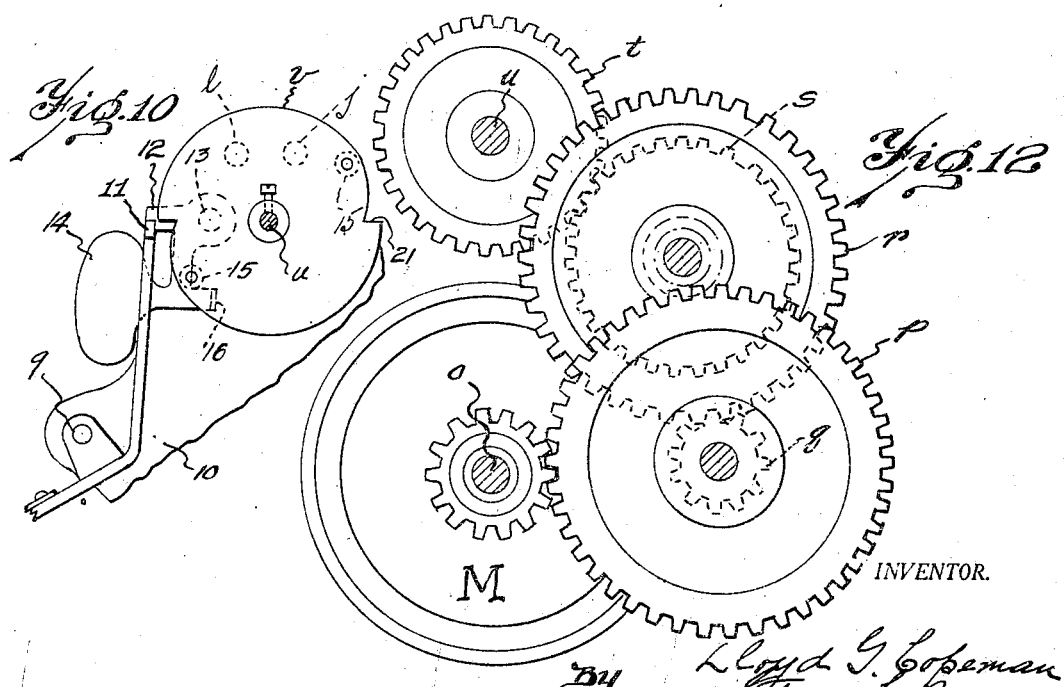

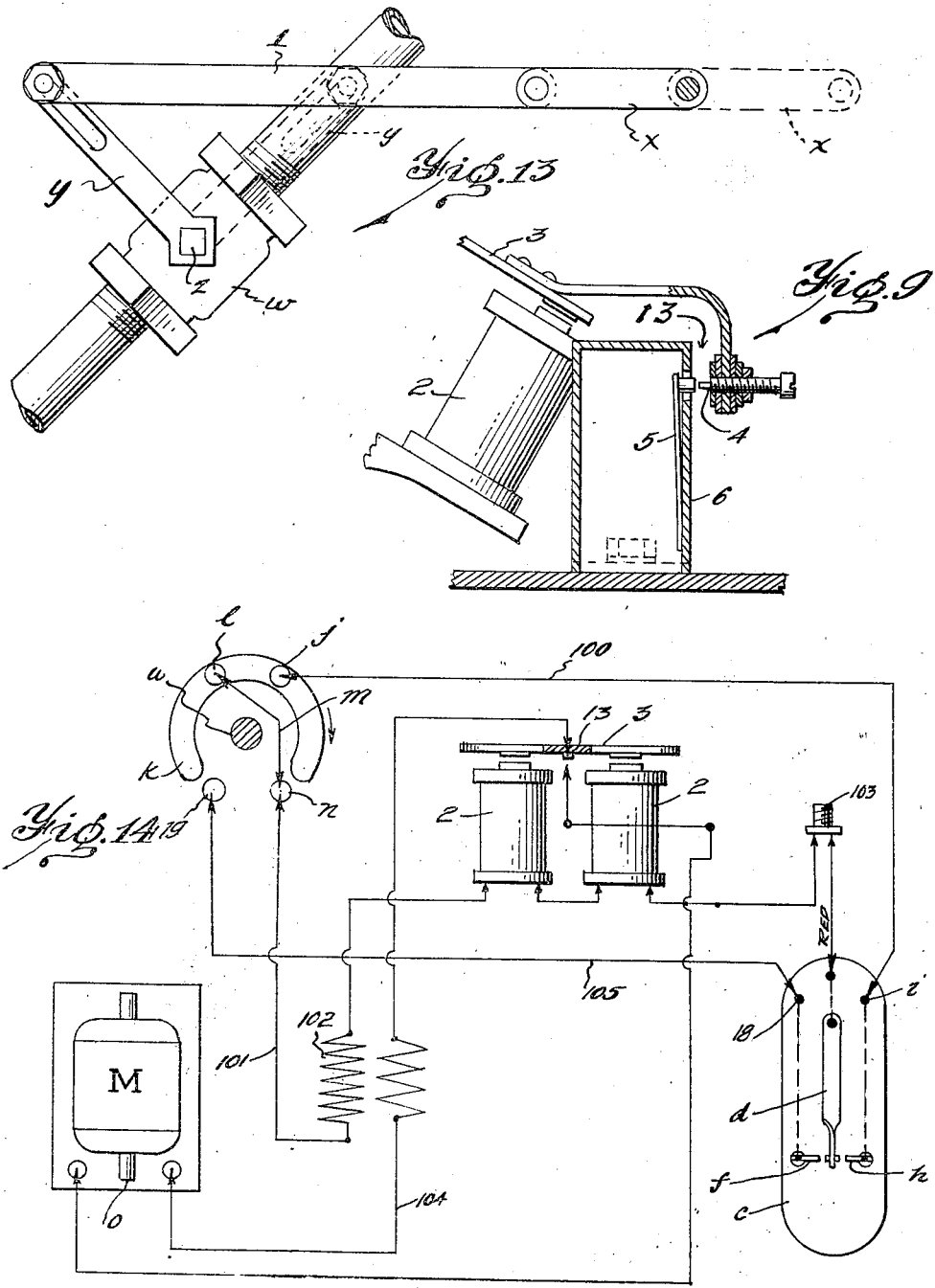

LLOYD G. COPEMAN, OF FLINT, MICHIGAN.

REFRIGERATING APPARATUS.

1,409,283. Specification of Letters Patent. Patented Mar. 14, 1922.

Application filed January 20, 1921. Serial No. 438,593.

*To all whom it may concern:*

Be it known that I, LLOYD G. COPEMAN, a citizen of the United States, residing at Flint, in the county of Genesee and State of Michigan, have invented certain new and useful Improvements in Refrigerating Apparatus, of which the following is a specification.

This invention relates to refrigerating apparatus and has for its object automatically-controlled refrigerating apparatus that can be coupled up with a water supply system having a pump controlled by pressure accumulating in the line.

The system is especially designed to meet the needs of rural communities and farmers where water is taken from wells. It results in an apparatus which cannot only be used to furnish water to service pipes and faucets but also can be used to furnish a cooling medium to a food storage box.

Furthermore, simply by changing an electrical connection on the thermostat the circulation of the water can be used to keep the temperature of the storage box up to a given point to prevent freezing in a box exposed to low outside temperatures.

In the drawings,—

Fig. 1 is a side elevation in the nature of a diagrammatic view of the entire installation.

Fig. 2 is a vertical cross section of the pressure controlled switch showing the same closed.

Fig. 3 is a vertical cross section of the same showing the switch open.

Fig. 4 is an enlarged front elevation of the thermostat.

Fig. 5 is an enlarged elevation of the thermostat with the cover plate removed.

Fig. 6 is a vertical section of the thermostat.

Fig. 7 is a plan view of the valve controlling mechanism.

Fig. 8 is an end elevation of the same.

Fig. 9 is an enlarged view of the switch controlled by the magnet.

Fig. 10 is a detailed view of the magnet armature and its control, taken on the line 10—10 of Fig. 7.

Fig. 11 is a section taken on the line 11—11 of Fig. 7.

Fig. 12 is a section taken on the line 12—12 of Fig. 7.

Fig. 13 is a section taken on the line 13—13 of Fig. 7.

Fig. 14 is a diagrammatic view of the wiring.

$a$ designates a refrigerating chamber or box similar to an ordinary ice-box except that the same is not diminished in its cubical storage space by the presence of an ice chamber filled up with ice or with a brine chamber filled with brine. The pipes that carry the cooling medium are formed into coils $b$ which can be located just behind the lining of the refrigerator, if desired, so as not to interfere with the storage space. The result is that the entire interior capacity of the refrigerator is available for food storage, which is a very material improvement over the usual ice-cooled refrigerator or the usual brine chamber refrigerator. $c$ designates a thermostat. This thermostat and its electrically-operated connections are shown diagrammatically in Fig. 14. $d$ is the switch arm of the thermostat, which is detailed in Figs. 4, 5 and 6. $e$ is a coil of thermostatic metal, usually brass and steel or two metals of different coefficients of expansion so that a variation in thermal conditions causes the thermostat element to wind up or unwind. The switch arm is thus caused to engage either the terminals $f$ or $h$. Supposing, for instance, the temperature in the food storage chamber rises to a predetermined point, this causes the thermostat element to unwind. This brings the switch arm $d$ into contact with the terminal $h$. Referring to Fig. 14, the circuit is traced through the wire 100 to the binding post $j$. The binding post $j$ wipes the split ring switch element $k$. This switch element is a sort of a circular formed horse-shoe or a split ring strip of spring metal (see Fig. 7, where its position with respect to the binding post $j$ is shown). A contact $l$ also engages this split ring switch element. Hence the circuit can be traced from the wire 100 to the post $j$ through the switch element $k$, to the post $l$, through the bridge wire $m$ to the post $n$, and then through the wire 101 to the primary winding 102 of the step-down transformer, thence around the magnets 2—2 to the service plug 103. The closing of this circuit starts the electric motor M, which has an armature shaft $o$ provided with a pinion (see Fig. 12) that meshes with the large gear $p$ that has a spur gear $q$ that meshes with the larger gear $r$ which in turn is provided with a smaller gear $s$ that meshes with the gear $t$ fastened to the shaft $u$. These are simply speed reducing gears for converting the high speed motor rotation into considerably slower speed for the shaft $u$.

Fastened to the shaft $u$ is a cam disk $v$ (see Fig. 10). On the face of this cam disk is screwed the split ring switch element $k$. This being on the shaft $u$ of course rotates with that shaft but obviously when it is rotated through half a turn a gap occurs in the electric circuit between the contacts $l$ and $j$ and hence stops the supply of energy for the motor. This half turn opens the valve $w$ (Figs. 13 and 7). To this valve is connected at the end of the shaft $u$, by means of the crank arm $x$ on the end of the shaft, the crank arm $y$ on the end of the squared valve stem $z$ and the link 1 connecting the two crank arms. The throw of the short crank arm through half a turn is the same chord distance as the throw of the longer crank arm $y$ through a quarter of a turn.

In the secondary or motor circuit 104 I employ a magnetically-operated but a switch mechanically maintained closed. This is detailed in Fig. 9. The primary circuit through the thermostat and the switch element $k$ winds around the magnets 2 (Fig. 14). Consequently these are energized when the thermostat switch arm $d$ is in contact with the contact $h$. This draws down the armature 3 and the contact point 4 engages with the spring contact 5 enclosed in the case 6 (see Fig. 9). The armature is provided with a continuing portion that forms an arm 8 (see Fig. 7). This is pivoted at 9 to the wall 10 of the case that supports the mechanism (Fig. 10). This arm is provided with a cross bar portion 11 adapted to engage in the notch of the detent 12 that is pivoted at 13 and is weighted at 14. This detent provides a lock to lock the secondary circuit switch 13 so it will not release until the shaft $u$ has made a complete half turn. It will be apparent that the circuit through the split ring switch element $k$ is broken slightly before the shaft has completed a full half turn. Consequently the secondary circuit switch 13 would be broken before the shaft $u$ completes a half turn. However, the detent 12 holds the armature down and the secondary circuit closed until the detent is releasd by reason of the cam roller 15 striking the cam following arm 16 on the detent 12. This lifts the toothed portion of the detent out of the way of the bar 11 on the armature arm and permits the weight 17 (Fig. 7) on the armature arm to swing the armature up and break the switch 13.

To close the valve, when a given fall of temperature has taken place in the refrigerator, the switch arm $d$ will be caused by the curling up of the thermostat element to engage the opposite contact $f$. Now referring to Fig. 14, it will be seen that the circuit can be traced through the wire 105 leading from the binding post 18 to the contact 19 adjacent the split ring switch element. The current will run through the switch element to the contact $n$. The circuit will continue through the primary winding 102 of the transformer, through the magnets and back to the thermostatic switch. The armature will again be attracted to the pole pieces of the magnets. The weighted detent 12 will drop over the bar 11 of the extended armature arm, thereby insuring the holding of the armature down to keep the switch for the secondary and motor circuit closed when the primary switch breaks before the half turn is quite completed. The switch through the primary circuit will break when the gap in the split ring switch intervenes between the two contacts $n$ and 19. The shaft $u$ will continue to rotate by virtue of the secondary circuit and the motor circuit being held closed by the detent engaging the armature arm until the complete half turn has been accomplished. The roll 15 will disengage the detent to permit the counterweight to raise the armature arm and break the secondary and motor circuit. This stops the motor. The valve will then be closed.

Referring to Fig. 10, it will be seen that the cam $v$ is provided with two diametrically-opposite shoulders 21. These are for the purpose of permitting the armature arm bar 11 to drop in toward the center of the cam to release the secondary circuit switch when the detent 12 is disengaged from the said bar. The high portion of the cam, it will be seen, just clears the bar 11 when the detent is engaging it, hence the high part of the cam serves as an additional means for making sure the circuit is not prematurely broken in case the detent 12 does not catch the bar 11. It will be obvious that at the time the split ring switch in the primary circuit is broken that the high part of the cam will be behind the bar 11, which will ride thereon and will not permit the separation of the contacts 4 and 5 until the bar drops off from the end of the shoulder 21, which will be substantially at the same time that the detent 12 would be released in case the same had been properly functioning.

The source of energy for the primary circuit, of course, can be any suitable supply of electricity. However, I have preferred to use the ordinary service line where, of course, the voltage is from 110 to 120. I, therefore, employ a transformer to step-down the current for the motor, which is preferably a six-volt motor.

This completes the detailed description of the devices between the thermostat and the valve. The operation effected by the cooling medium will now be described. The water line 26 is connected with a source of cold water, such, for instance, as well water, which I have found to ordinarily range between 47 and 54 degrees in temperature. Water of this temperature will maintain a refrigerator and food storage chamber equipped with my apparatus at a temperature considerably lower than the temperature of the ordinary ice chest. The thermostat, for instance, is set so that when the temperature in the chamber rises above 51 degrees, the valve is opened by the mechanism already described. This allows the water from the line 26 to run through the coils and thereby absorb heat and bring the temperature of the chest down to nearly the temperature of the water entering. When the temperature of the refrigerator has reached, we will say, 50 degrees, the thermostat contacts the opposite contact $f$ and the valve operating mechanism closes the valve in the way just above described, shutting off the circulation of the cold water through the refrigerator.

One of the important features of my control for this system of refrigeration is that it permits the same pump to be used to draw water for ordinary house service, such as water closets, spigots, garden hose, etc., without in any way interfering with its operation. Ordinarily the control of artificial refrigerating apparatus is by the thermostat cutting on or off an electric motor which operates a compressor which supplies an expansible medium to the box. No such mode of operation is utilized in my apparatus. In my apparatus I simply couple the same up with a pump controlled by the pressure accumulating in the line. By utilizing a thermostat simply to cut off the flow of the fluid through the refrigerating coils, I create a back pressure which operates on the control valve to stop the motor that runs the pump, provided that none of the service taps are open. If any of the service taps are open, then the operation of the thermostat in the refrigerator simply cuts off the flow through the refrigerator and has no effect on the service lines until all these taps are closed. This type of refrigerating control not only lends itself to domestic use of the individual farmer but a number of persons in a community may be served from a single pump for obviously several refrigerators and several series of taps could be served from the same main and each refrigerator and each tap could properly function, the pump continuing to run as long as circulation is demanded in any of the refrigerators or water is discharged through any of the taps. It will, therefore, be evident that the system is very nicely adapted for community use.

I have illustrated a number of service taps, for instance, the spigot 22 over the sink 23 and the cock 24 over the laundry tub 25. The main 26 leads to a pressure-controlled switch 27, the working parts of which are detailed in Figs. 2 and 3. This comprises a dome 28 into which the water passes from the pump 29 which is run by the motor M'. The dome 28 is surmounted by a casing 30, the base of which has a nipple 31 that screws into the top of the dome. On to this base is screwed a casting 32 which has a pair of upright side supports or plates 33. Between the base of the casting 32 and the base of the lower member is clamped a rubber diaphragm 34. A passage-way 35 leads from the interior of the dome 28 into the chamber below the diaphragm. 36 is a cross member between the side uprights which is provided with an adjusting nut 38 having a central bore through which is guided the stem 39. The lower end of this stem forms into a head 40 which is provided with a plate portion 41 which is adapted to lie against the diaphragm. A coil spring 42 ordinarily keeps the stem projected downwardly. The resistance of this spring may be adjusted by means of the nut 38. The head 40 is provided with a socket that engages the ball terminal 43 of the bell crank lever 44. The upper end of this lever has a ball terminal 45 which engages in a socket portion of one of the three toggle arms 46, 47 and 48, which form sort of a compound toggle.

Comparing Figs. 2 and 3, the action will be seen. When the spring 42 is subjected to a pressure by the diaphragm less than the predetermined pressure, the parts remain in the position shown in Fig. 2, that is, the expansion of the spring 42 forces the head 40 downwardly and consequently the toggle arms remain in the position shown in Fig. 2, the two arms at the left being at the upper side of the dead center line, thereby keeping the switch points 49 and 50 together. When the pressure accumulates in the dome 28 due to the closing of all the taps and all the refrigerating coils, the pump continues until the pressure in the dome 28 has risen to a predetermined degree, say 60 pounds, for instance (the pressure necessary to overcome the spring may be varied by adjusting the nut $w$). The diaphragm then overcomes the pressure of the spring 42 and the bell crank lever 44 is thrown to the position shown in Fig. 3, thereby causing the two toggle arms at the left to break downwardly below their dead center line and thereby throw the switch open, as shown in this figure. This discontinues the supply of electric energy to the motor and consequently the pump stops. Obviously when any one of the taps is open or the thermostatically-controlled valve to the refrigerator, the pressure in the dome 28 falls and the spring 42 closes the electric switch and the motor again comes into operation.

One of the greatest objections to the ordinary expanding gas type of refrigeration is that most of the gases available for this purpose are extremely corrosive, causing the various valves to deteriorate and get out of repair, and any leakage in the system is not only harmful to health but results in loss of the refrigerating medium. Hence a system of this character requires a great deal of service and repair, which makes it ill-adapted for the use of the rural dweller. The present system does away with all this gas compressing and expanding apparatus and entirely eliminates the corrosive gases. Furthermore, the system is relatively cheap as compared with a refrigerating apparatus working on the principle of compressing and expanding gas, especially when it is taken into consideration that the same apparatus may be utilized to serve the entire house and farm with water. Furthermore, the water passing through the refrigerator discharges through the discharge line shown in Fig. 1, where it appears as a waste line, but the discharge water can be further used in the garden, for instance, or to flush toilets, etc.

Another feature over the brine tank is that the refrigerating medium is contained in coils which occupy a considerable area in the total wall space of the chest and hence present a relatively great volume of refrigerating medium to quickly absorb any heat allowed to come into the chamber by opening of the door. With the so-called iceless refrigerator the brine and the air in the brine compartment is rather a small volume of colder medium to absorb the heat and restore the desired thermal condition. Hence considerable time is required to restore the desired thermal condition, where a door has been left open, and the food suffers from this.

I have shown an electric motor as driving the pump, but obviously some other motor might be used as, for instance, a gas engine provided with a suitable electric starter, or something of this kind. I shall, therefore, refer to the motor element broadly as a motor, whether electric, gas or some other means of converting energy into mechanical work.

Obviously by simply changing the wire 105 to the binding post $i$ and the wire 100 to the binding post 18, the flow of the water through the refrigerator will be based upon a reverse condition, to-wit, when the temperature falls to a predetermined point the water will begin to circulate and when the temperature rises to a given point the circulation of the water will be cut off. This may be a useful alteration of operation in cold weather when the refrigerator is in a weather-exposed place. The water is then used to keep the temperature up to a predetermined degree so that things will not freeze.

The contact screws $f$ and $h$ may be turned in or out to change the temperature at which the valve action is secured. The thermometer 120 on the face of the thermostat will aid in securing the proper adjustment of these contact screws.

What I claim is:

1. In a refrigerating apparatus, the combination of a box or refrigerating chamber, a source of water supply arranged to provide water under pressure, a pipe line for conducting such water through said box or chamber for tending to equalize the temperature of the interior of the same and the water, a water discharge line leading from such pipe line and including a waste line, a valve controlling the flow through said waste line, a thermostat influenced by the temperature of the interior of the box or chamber, and connections controlled by said thermostat for opening and closing said valve.

2. In a refrigerating apparatus, the combination of a box or refrigerating chamber, a source of water supply arranged to provide water under pressure, a line for conducting water therefrom into proximity with said box or chamber and tending to equalize the temperature of the interior of the box or chamber and the water passing through said line, a water discharge line leading from such line and including a waste line, a valve controlling the flow of water through said waste line, a thermostat influenced by the temperature of the interior of the box or chamber, and a motor for operating said valve having an independent source of energy but controlled by said thermostat.

3. In a refrigerating apparatus, the combination of a box or refrigerating chamber, a source of water supply arranged to provide water under pressure, a line for conducting water therefrom into proximity with said box or chamber and tending to equalize the temperature of the interior of the box or chamber and the water passing through said line, a water discharge line leading from such line and including a waste line, a valve controlling the flow of water through said waste line, a thermostat influenced by the temperature of the box or chamber, and a motor opening and closing said valve with a quick positive action due to a source of energy independent of the thermostat but initiated by said thermostat.

In testimony whereof I affix my signature.

LLOYD G. COPEMAN.